United States Patent [19]

Asai et al.

[11] Patent Number: 5,529,652
[45] Date of Patent: Jun. 25, 1996

[54] METHOD OF MANUFACTURING CONTINUOUS FIBER-REINFORCED THERMOPLASTIC PREPREGS

[75] Inventors: Toshihiro Asai; Toshio Ohara; Tatuya Tanaka; Shinji Hashizume, all of Kobe, Japan

[73] Assignee: Kabushiki Kaisha Kobe Seiko Sho, Kobe, Japan

[21] Appl. No.: 824,915

[22] Filed: Jan. 22, 1992

Related U.S. Application Data

[63] Continuation of Ser. No. 518,230, May 7, 1990, abandoned, which is a continuation of Ser. No. 217,174, Jul. 11, 1988, abandoned.

[30] Foreign Application Priority Data

Jul. 11, 1987 [JP] Japan ................................ 62-173363
Apr. 14, 1988 [JP] Japan .................................. 63-92735

[51] Int. Cl.[6] .................................................. B05D 1/18
[52] U.S. Cl. ......................... 156/180; 156/166; 156/433; 156/441; 264/135; 264/136; 425/112; 425/113; 425/114
[58] Field of Search .............................. 427/434.6, 434.2, 427/434.7; 156/166, 181, 180, 433, 441; 264/135, 136, 174; 425/112, 113, 114; 118/420, 419, 125, 118, 117, 124

[56] References Cited

U.S. PATENT DOCUMENTS

| | | |
|---|---|---|
| 3,159,877 | 12/1964 | Orsini . |
| 3,320,635 | 5/1967 | Zolotarevsky . |
| 3,404,433 | 10/1968 | Krutchen et al. ........................ 425/114 |
| 3,413,186 | 11/1968 | Marzocchi ............................... 156/148 |
| 3,703,396 | 11/1972 | Lamanche et al. .................. 118/125 X |
| 3,742,106 | 6/1973 | Price . |
| 3,993,726 | 11/1976 | Moyer ...................................... 264/174 |
| 4,058,581 | 11/1977 | Park ..................................... 156/166 X |
| 4,439,387 | 3/1984 | Hawley ............................... 425/114 X |
| 4,541,884 | 9/1985 | Cogswell et al. ....................... 156/166 |
| 4,559,262 | 12/1985 | Cogswell et al. .................... 156/166 X |
| 4,643,126 | 2/1987 | Wilkinson ............................ 118/420 X |
| 4,728,387 | 3/1988 | Hilakos ................................ 118/420 X |
| 4,778,367 | 10/1988 | Hilakos .................................... 425/113 |
| 4,820,366 | 4/1989 | Beever et al. ........................... 156/166 |
| 4,864,964 | 9/1989 | Hilakos ............................... 264/174 X |

FOREIGN PATENT DOCUMENTS

| | | |
|---|---|---|
| 2137059 | 8/1974 | Germany . |
| 52-3985 | 1/1977 | Japan . |
| 58-211415 | 12/1983 | Japan . |
| 60-6764 | 2/1985 | Japan . |
| 60-36136 | 2/1985 | Japan . |
| 61-46292 | 10/1986 | Japan . |
| 63-147622 | 6/1988 | Japan ..................................... 118/420 |
| 777967 | 7/1957 | United Kingdom . |

OTHER PUBLICATIONS

Cagle, Charles V., *Handbook of Adhesive Bonding*, McGraw Hill Book Co, 1973, Chapter 8, pp. 8–1, 8–2, 8–5, 8–7, 8–3, Hot Melt Adhesives.

*Primary Examiner*—Jeff H. Aftergut
*Attorney, Agent, or Firm*—Oblon, Spivak, McClelland, Maier & Neustadt

[57] ABSTRACT

A continuous FRTP prepreg manufacturing apparatus comprises an extruder, a crosshead having a main body internally provided with a resin chamber for containing a molten thermoplastic resin extruded therein by the extruder and joined to the discharge end of the extruder, a cooling unit disposed outside and near the exit of the main body of the crosshead, and a winding unit for taking up a prepreg. A fiber bundle inlet unit and a fiber bundle outlet nozzle unit are provided respectively at one end and at the other end of the main body of the crosshead. Guide rollers and impregnating rollers are arranged within the main body of the crosshead so that a tension is applied to the fiber bundle during impregnation or so that the fiber bundle is expanded during impregnation and is condensed after impregnation. The resin-impregnated fiber bundle is heated to a temperature higher than the melting point of the thermoplastic resin at the fiber bundle outlet nozzle unit, and then the resin-impregnated fiber bundle is cooled to a temperature below the melting point of the thermoplastic resin immediately after being delivered from the fiber bundle outlet nozzle unit to form a continuous FRTP prepreg.

1 Claim, 6 Drawing Sheets

METHOD OF MANUFACTURING CONTINUOUS FIBER-REINFORCED THERMOPLASTIC PREPREGS

This application is a continuation of application Ser. No. 07/518,230, filed on May 7, 1990, now abandoned, which is a continuation of Ser. No. 07/217,174, filed Jul. 11, 1988, now abandoned.

BACKGROUND OF THE INVENTION

1. Field of the Invention

The present invention relates to a method of manufacturing continuous fiber-reinforced thermoplastic (hereinafter abbreviated to "FRTP") prepregs and an apparatus for carrying out the same.

2. Description of the Prior Art

The continuous FRTP prepreg is a thermoplastic forming material reinforced by metallic fibers, vegetable fibers, organic fibers or inorganic fibers such as carbon fibers and glass fibers. As is well known, the continuous FRTP prepreg is formed in pellets, ribbons for filament winding, UD sheets or cloth sheets, and these materials are processed through an injection molding process, a press forming process, a bag forming process or a filament winding process to manufacture structural members and machine parts.

Various methods of manufacturing continuous FRTP prepregs have been proposed. Japanese Patent Publication No. 52-3985 discloses a method, in which a fiber bundle, namely, a bundle of filaments such as a tow or a bundle of staple fibers, is impregnated with a resin powder, and then the fiber bundle impregnated with the resin powder is heated to melt the resin powder. Japanese Patent Laid-open No. 60-36136 discloses a method, in which the surface of a fiber bundle is coated with a molten thermoplastic resin, and then the molten thermoplastic resin is made to permeate the fiber bundle by belt press. Japanese Patent Laid-open No. 58-211415 discloses a method, in which a sandwich of resin sheets and fiber sheets is combined by heating. Japanese Patent Publication Nos. 60-6764 and 61-4629 disclose methods, in which a fiber bundle is impregnated with a resin emulsion, the fiber bundle impregnated with the resin emulsion is dried, and then the fiber bundle is coated with the resin in the crosshead of an extruder.

Figure 10:
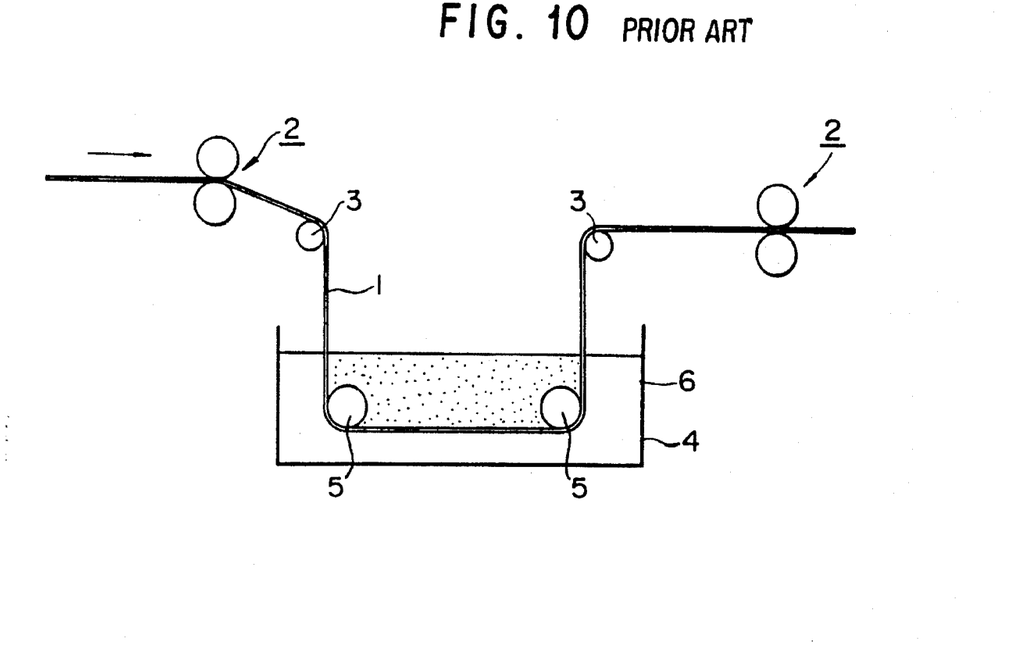
FIG. 10 is a schematic view of assistance in explaining a conventional method of a resin-solution system of manufacturing a continuous FRTP prepreg and FIG. 11 is a schematic view of assistance in explaining a conventional method of a hot-melt system of manufacturing a continuous FRTP prepreg.

FIG. 10 illustrates an exemplary impregnating device employed in a conventional apparatus for manufacturing a continuous FRTP prepreg. A resin solution 6 prepared by dissolving a resin in an appropriate solvent is contained in an impregnating tank 4. A filament bundle 1 is fed by feed rollers 2 and is guided by guide rollers 3 and 5 so as to pass through the resin solution 6 to impregnate the filament bundle 1 with the resin solution 6. Then, the filament bundle 1 impregnated with the resin solution 6 is subjected to a solvent extraction process to remove the solvent so that only the viscous resin remains in the filament bundle 1. Thus a continuous FRTP prepreg having high formability. This conventional apparatus, however, has a problem that it is difficult to remove the solvent completely from the filament bundle and the residual solvent deteriorates the characteristics of the continuous FRTP prepreg and those of formed products manufactured by using the continuous FRTP prepreg.

To avoid such adverse influence of the solvent on the products, methods of manufacturing a continuous FRTP prepreg without using the solvent, such as a hot-melt method (pultrusion method) and a fluidized bed method, have been proposed.

Figure 11:
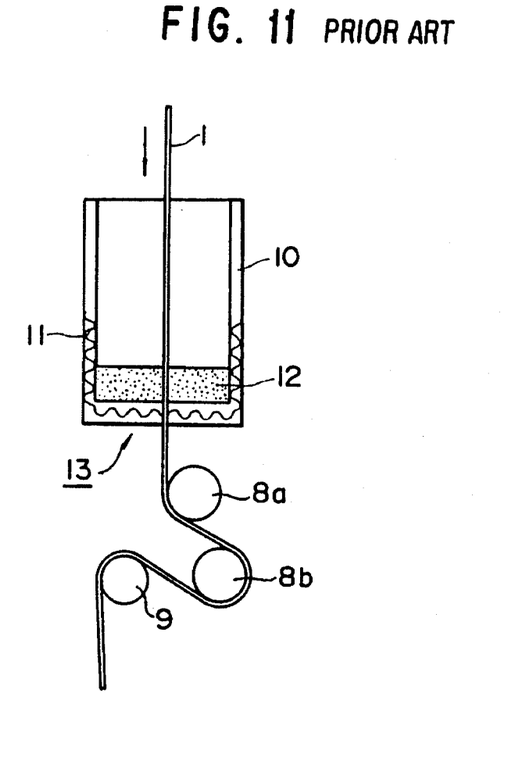

FIG. 11 illustrates part of an impregnating device employed in carrying out the previously proposed hot-melt method. A molten resin 12 is contained in a heating tank 10 provided with a heater for heating the molten resin 12, and an orifice 13 formed in the bottom wall thereof. A filament bundle 1 introduced through the upper opening of the heating tank 10 into the heating tank 10 is passed through the molten resin 12 and is pulled out through the orifice in a prepreg. Then, the prepreg is shaped by banding rollers 8a and 8b, and then the shaped prepreg is heated again by a heating roller 9 so that the resin is sufficiently fluidized to permeate the filament bundle 1 perfectly.

In the conventional fluidized bed method, a fiber sheet, such as a cloth sheet or a UD sheet, is immersed in a molten resin contained in a heating tank as the fiber sheet is passed through the heating tank to manufacture a sheet-form continuous FRTP prepreg through a single process.

Both the conventional hot-melt method and the fluidized bed method have a problem that it is very difficult to maintain uniform distribution of the temperature of the molten resin in the heating tank. The temperature of the molten resin is not distributed uniformly in the heating tank due to the low thermal conductivity of the resin, and thereby the viscosity of the molten resin varies from place to place in the heating tank. Consequently, the filament bundle or the like is impregnated partially insufficiently with the molten resin and, in many cases, voids are formed in the resin-impregnated filament bundle. To impregnate the fiber bundle forcibly with the molten resin and to remove bubbles remaining in the fiber bundle, the fiber bundle is hot-pressed by heating means, such as the heating roller 9, after being immersed in the molten resin. However, the conventional method is unable to remove the bubbles perfectly from the resin-impregnated fiber bundle, which deteriorates the characteristics of products formed by using the resin-impregnated fiber bundle.

Furthermore, portions of the fiber bundle insufficiently impregnated with the molten resin due to viscosity variation in the heating tank entails irregular strength distribution in the prepreg and the large frictional resistance of the molten resin heated at a low temperature damages the fiber bundle, so that weak portions are formed in the prepreg. Since the thermoplastic resin is heated to a high temperature near the critical temperature at which the thermoplastic resin is decomposed and the thermoplastic resin permeated the fiber bundle is heated again by the heating roller 9, a large quantity of energy is wasted. Such disadvantages become further conspicuous when a heat-resistant thermoplastic resin having a high melting point, such as polyetheretherketone or polyestersulfone, is used.

SUMMARY OF THE INVENTION

Accordingly, it is an object of the present invention to provide a method of manufacturing a high-quality continuous FRTP prepreg, capable of sufficiently, uniformly and satisfactorily impregnating a fiber bundle with a molten resin without wasting energy.

It is another object of the present invention to provide an apparatus for manufacturing a high-quality continuous FRTP prepreg, capable of manufacturing a sufficiently, satisfactorily and uniformly impregnated with a molten resin.

In one aspect of the present invention, a method of manufacturing a continuous FRTP prepreg, comprises steps of introducing a fiber bundle into a resin chamber containing a molten resin, passing the fiber bundle under a tension applied by rotary means through the molten resin contained in the resin chamber, heating the resin-impregnated fiber bundle near the exit of the tank to a temperature in the range of the melting point of the resin and a temperature higher than the melting point of the resin by 30° C., and cooling the resin-impregnated fiber bundle just outside the exit of the resin chamber to a temperature below the melting point of the resin.

In another aspect of the present invention, an apparatus for manufacturing a continuous FRTP prepreg comprises an extruder for extruding a molten thermoplastic resin, a crosshead connected to the discharge end of the extruder, internally provided with a resin chamber for containing a molten thermoplastic resin, and having a fiber bundle inlet unit and a fiber bundle outlet nozzle unit respectively in one end and the other end thereof, winding means for taking up a fiber bundle fed into the crosshead and impregnated with a molten thermoplastic resin, and rotary means provided in the resin chamber to apply a tension to the fiber bundle and to impregnate the fiber bundle with the molten thermoplastic resin.

According to the present invention, a fiber bundle impregnated with a molten thermoplastic resin is taken up by the winding means under a predetermined tension. Impregnating rollers provided within the resin chamber is rotated frictionally by the running fiber bundle to positively make the molten thermoplastic resin permeate the fiber bundle. The rotating speed of the impregnating rollers increases according to the running speed of the fiber bundle.

BRIEF DESCRIPTION OF THE DRAWINGS

The above and other objects, features and advantages of the present invention will become apparent from the following description taken in conjunction with the accompanying drawings, in which.

DETAILED DESCRIPTION OF THE PREFERRED EMBODIMENTS

Figure 1:
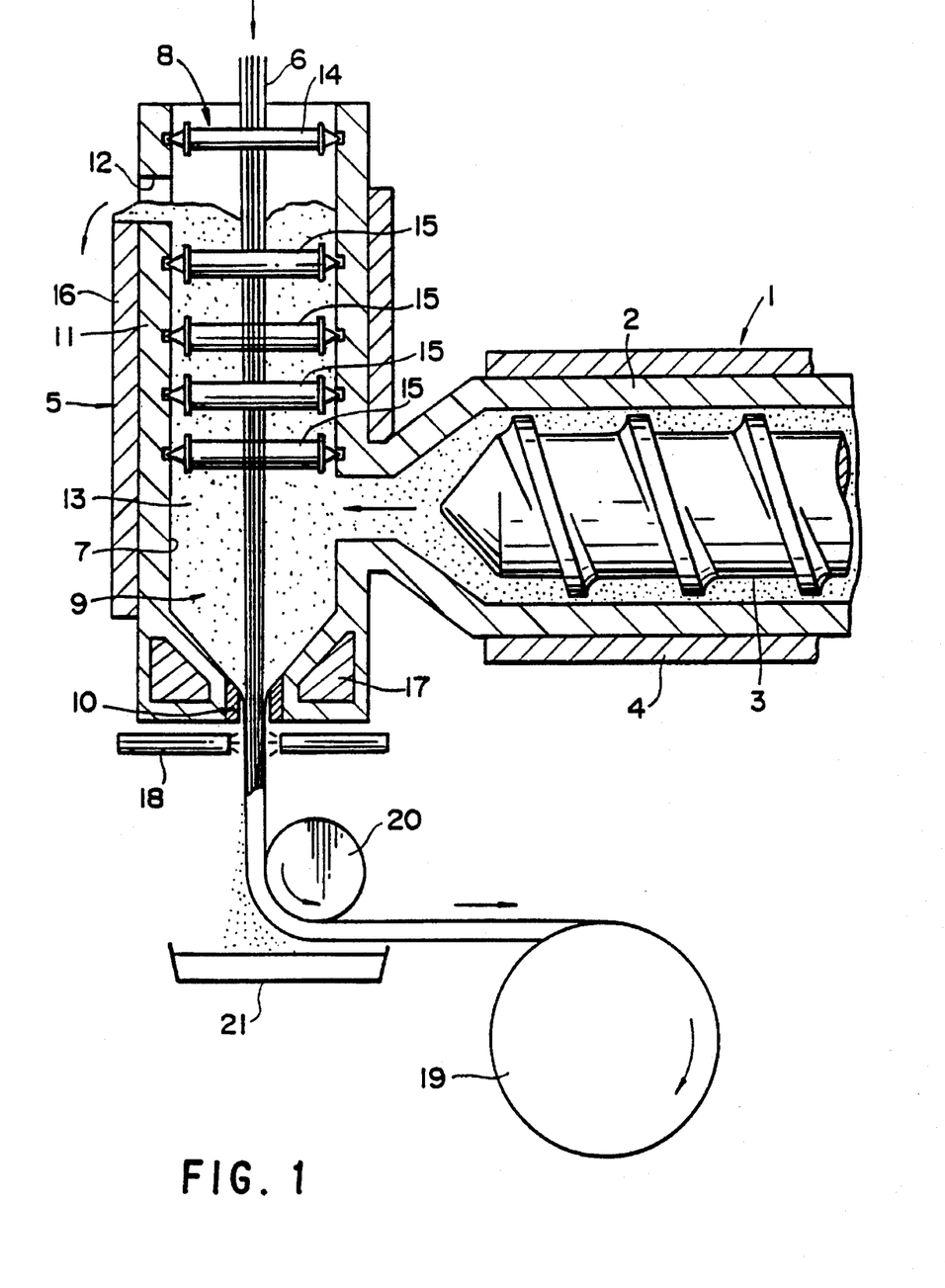
FIG. 1 is a schematic sectional view showing an essential portion of a continuous FRTP prepreg manufacturing apparatus, in a first embodiment, according to the present invention.

First Embodiment:

Referring to FIG. 1, an extruder 1 comprises a casing 2, a rotary screw 3 provided coaxially within the casing 2, and a heater 4 for heating the casing 2. A crosshead 5 is joined in a vertical position to the discharge end of the extruder 1 with the longitudinal axis thereof extending perpendicularly to the direction of extrusion, namely, the longitudinal axis of the extruder 1. A crosshead 5 may be joined, not shown, at angles to its vertical position.

The crosshead 5 has a main body 11 internally provided with a vertically elongate cavity 7. The main body 11 has a fiber bundle inlet unit 8 in the upper end of the cavity 7, a resin chamber 9 formed in the middle portion of the cavity 7, and a fiber bundle outlet nozzle unit 10 in the lower end of the cavity 7. An overflow opening 12 is formed in the main body 11 of the crosshead 5 in the upper portion of the same. A molten thermoplastic resin 13 extruded by the rotary screw 3 of the extruder 1 fills up the resin chamber 9 and the excessive molten thermoplastic resin 13 overflows through the overflow opening 12, so that a substantially fixed quantity of the molten thermoplastic resin is contained constantly in the resin chamber 9.

At least one guide roller 14 is provided rotatably in the fiber bundle inlet unit 8, and a plurality of impregnating rollers 15 are provided rotatably at suitable vertical intervals in the resin chamber 9. In this embodiment, the guide roller 14 and the impregnating rollers 15 are arranged in a horizontal position in parallel to each other.

A heater 16 is mounted on the main body 11 of the crosshead 5 to heat the resin chamber 9. An adjustable heater 17 is provided in the fiber bundle outlet nozzle unit 10.

A cooling unit 18 is disposed near and outside the fiber bundle outlet nozzle unit 10 to cool the resin-impregnated fiber bundle 6 quickly to a temperature below the melting point of the thermoplastic resin.

A winding unit 19 takes up the resin-impregnated fiber bundle 6, namely, a prepreg, under a desired tension. Indicated at 20 is a guide roller and at 21 is a pan for containing cooling water discharged by the cooling unit 18 to cool the resin-impregnated fiber bundle 6.

The rotary screw 3 extrudes the molten thermoplastic resin 13 continuously into the resin chamber 9 of the crosshead 5 and the excessive molten thermoplastic resin 13 overflows through the overflow opening 12, so that a substantially fixed amount of the molten thermoplastic resin 13 is contained constantly in the resin chamber 9. The amount of the molten resin 13 in the chamber 9 may be kept constant without the overflow opening 12 by controlling the flow rate of molten resin with the rotary screw of the extruder, using a level sensor or a pressure sensor, not shown, of the molten resin in the chamber 9.

Figure 2:
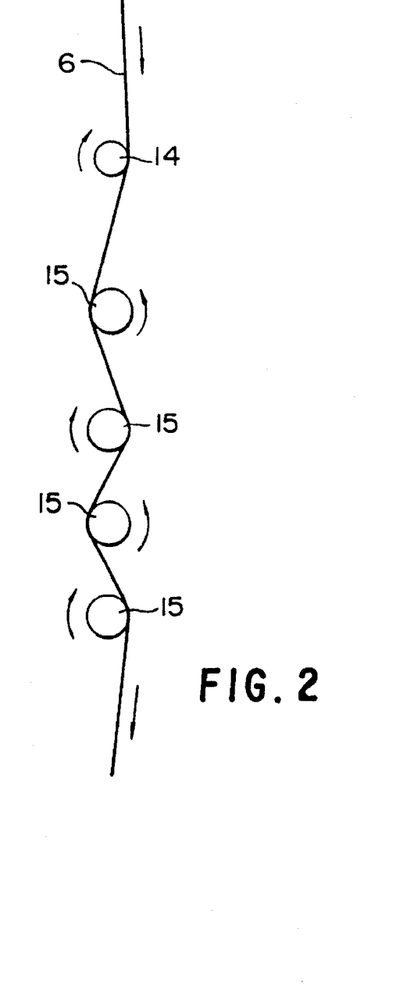
FIG. 2 is a diagrammatic illustration of assistance in explaining respective modes of rotation of rollers.

The fiber bundle 6 is introduced through the fiber bundle inlet unit 8 into the resin chamber 9, runs through the main body 11 along a zigzag path defined by the guide roller 14 and the impregnating rollers 15 so as to pass alternately on the opposite sides of the guide roller 14 and the impregnating rollers 15 as shown in FIG. 2, runs outside the main body 11 through the fiber bundle outlet nozzle unit 10, and is taken up continuously by the winding unit 19.

Thus, the fiber bundle 6 comes into contact with the guide roller 14 and the impregnating rollers 15 frictionally dragging the guide roller 14 and the impregnating rollers 15 for rotation as the same runs downward under a tension. As the impregnating rollers 15 rotates, the molten thermoplastic resin 13 coating the circumferences of the impregnating rollers 15 is forced to permeate the fiber bundle 6. The degree of impregnation of the fiber bundle 6 increases with the passage of the fiber bundle 6 through the plurality of impregnating rollers 15.

Then, the fiber bundle 6 thus impregnated with the molten thermoplastic resin 13 runs outside the crosshead 5 through the fiber bundle outlet nozzle unit 10 heated by the heater 17 at a temperature in the range of a temperature above the melting point of the thermoplastic resin and a temperature lower than a temperature higher than the melting point of the thermoplastic resin by 30° C., the resin-impregnated fiber bundle 6 is cooled quickly by the cooling unit 18 disposed directly below the fiber bundle outlet nozzle unit 10 to form a desired prepreg, and then the prepreg is taken up continuously by the winding unit 19.

Since the impregnating rollers 15 are dragged frictionally for rotation by the running fiber bundle 6 and the molten thermoplastic resin 13 is forced to permeate the fiber bundle 6 by the impregnating rollers 15, the fiber bundle 6 can sufficiently be impregnated with the molten thermoplastic resin 13 even if the fiber bundle 6 runs at a high running speed. Thus, a satisfactory prepreg can be manufactured at a high productivity.

Since the fiber bundle outlet nozzle unit 10 is heated at a temperature near the melting point of the thermoplastic resin, the resin-impregnated fiber bundle 6 can readily be cooled to a temperature below the melting point of the thermoplastic resin and can be solidified immediately after the resin-impregnated fiber bundle 6 has been delivered from the fiber bundle outlet nozzle unit 10. The solidification of the resin-impregnated fiber bundle 6 and the tension exerted on the resin-impregnated fiber bundle 6 by the winding action of the winding unit 19 condense the resin-impregnated fiber bundle 6 effectively to deaerate the resin-impregnated fiber bundle 6. Thus, a satisfactory prepreg not having any void is manufactured.

The rotation of the impregnating rollers 15 stirs the molten thermoplastic resin 13 in the resin chamber 9, whereby the temperature of the molten thermoplastic resin 13 is uniformly maintained.

Figure 3:
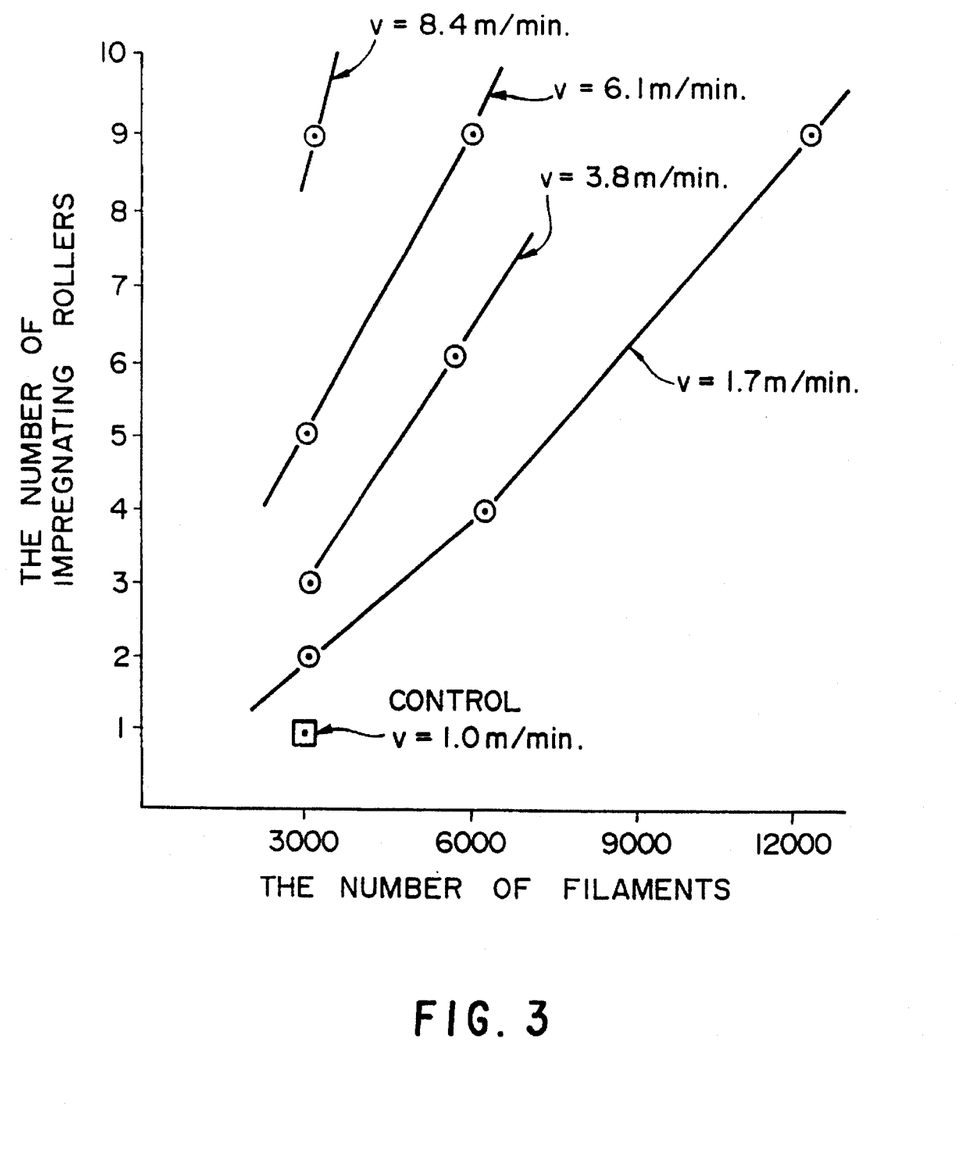
FIG. 3 is a graph showing the relation between the running speed of the fiber bundle, the number of impregnating rollers and the number of filaments of a tow.

The performance of the continuous FRTP prepreg manufacturing apparatus was tested through experimental fiber bundle impregnating operation. FIG. 3 shows the results of the experimental operation. Various fiber bundles differing from each other in the number of the component filaments were impregnated with nylon resin. When the number of the impregnating roller 15 was two, the manufacturing speed was accelerated up to 1.7 times that of control point with one impregnating roller 15. When the number of the impregnating rollers 15 is nine or above, the continuous FRTP prepreg manufacturing apparatus of the present invention is capable of operating at a manufacturing speed 1.7 times that of control point even if the number of the component filaments of the fiber bundle is 12,000. Thus, the productivity of the continuous FRTP prepreg manufacturing is increased by an increase of impregnating roller 15 in the present invention.

Figure 4:
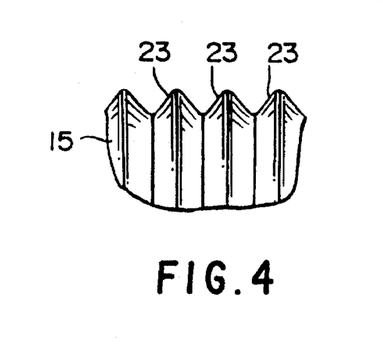
FIG. 4 is a fragmentary view of an impregnating roller employed in a continuous FRTP prepreg manufacturing apparatus, in a second embodiment, according to the present invention.

Second Embodiment:

FIG. 4 shows an impregnating roller 15 employed in a continuous FRTP prepreg manufacturing apparatus, in a second embodiment, according to the present invention. This impregnating roller 15 has a circumference provided with a plurality of grooves 23. This impregnating roller 15 has an expanding effect on a fiber bundle 6, which improves the fiber bundle impregnating efficiency of the continuous FRTP prepreg manufacturing apparatus.

Figure 5:
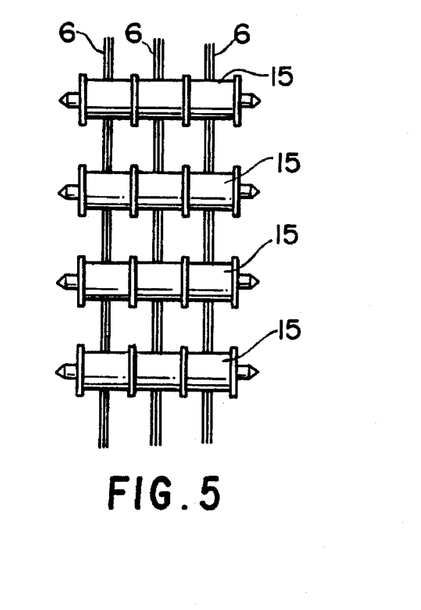
FIG. 5 is an illustration of assistance in explaining the feature of a continuous FRTP prepreg manufacturing apparatus, in a third embodiment, according to the present invention.

Third Embodiment:

FIG. 5 shows impregnating rollers 15 employed in a continuous FRTP prepreg manufacturing apparatus, in a third embodiment, according to the present invention. The impregnating rollers 15 are designed so as to guide a plurality of fiber bundles 6 through the crosshead 5.

Figure 6:
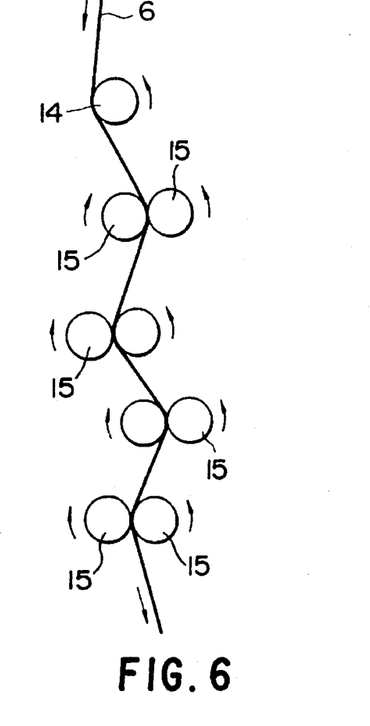
FIG. 6 is an illustration of assistance in explaining the feature of a continuous FRTP prepreg manufacturing apparatus, in a fourth embodiment, according to the present invention.

Fourth Embodiment:

FIG. 6 shows the arrangement of impregnating rollers 15 within the crosshead 5. In the fourth embodiment, the impregnating rollers 15 are arranged in pairs. A fiber bundle is compressed and expanded by the pairs of impregnating rollers 15, and thereby the molten thermoplastic resin is forced more effectively and surely to permeate the fiber bundle 6.

Figure 7:
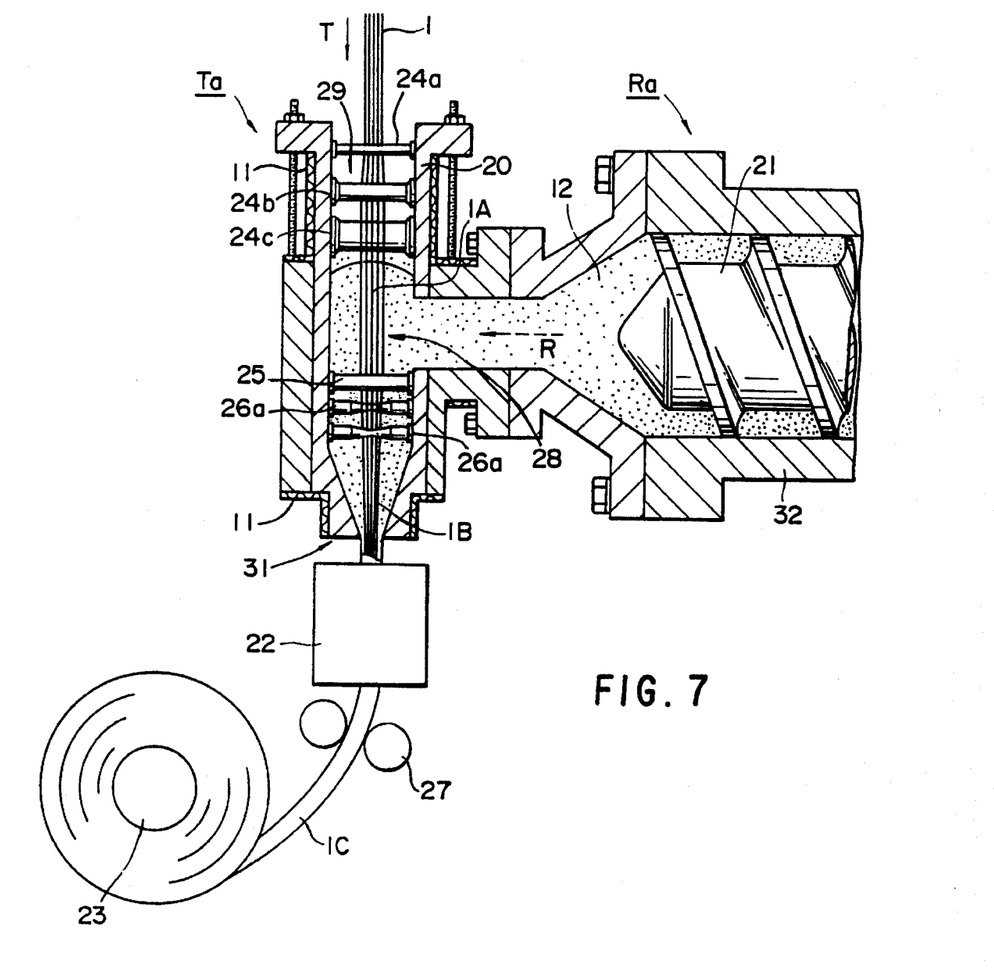
FIG. 7 is a sectional view showing an essential portion of a continuous FRTP prepreg manufacturing apparatus, in a fifth embodiment, according to the present invention.

Fifth Embodiment:

Referring to FIG. 7 showing a continuous FRTP prepreg manufacturing apparatus, in a fifth embodiment, according to the present invention, the continuous FRTP prepreg manufacturing apparatus has an extruder Ra and a crosshead Ta joined in a vertical position to the discharge end of the extruder Ra. The extruder Ra has a horizontal cylindrical casing 32 and a rotary screw 21 coaxially extended within the casing 32. The crosshead Ta has a main body 20. The respective longitudinal axes of the extruder Ra and the crosshead Ta intersect each other at right angles. A cavity in the discharge end of the extruder Ra communicates with the interior of the main body 20 of the crosshead Ta. The crosshead Ta has an upper fiber bundle inlet unit 29, an intermediate resin chamber 28 for containing a molten thermoplastic resin 12, and a lower fiber bundle outlet nozzle unit 31. Three parallel, cylindrical guide bars 24a, 24b and 24c are disposed in the fiber bundle inlet unit 29 across the running direction of a fiber bundle 1 so as to define a zigzag path for the fiber bundle 1. A guide bar 25 and two parallel condensing bars 26a and 26b having a biconical surface are disposed in the lower section of the resin chamber 28 across the running direction of the fiber bundle 1. A cooling unit 22 is provided below the fiber bundle outlet nozzle unit 31. A prepreg 1C formed by impregnating the fiber bundle 1 with the molten thermoplastic resin 12 is taken up by a winding unit 23 provided after the cooling unit 22. A heater 11 is mounted on the main body 20 of the crosshead Ta so as to surround the resin chamber 28 to keep the molten thermoplastic resin 12 contained in the resin chamber 28 at a fixed temperature.

In operation, the molten thermoplastic resin 12 melted by heat generated by a heater, not shown, mounted on the casing 32, and heat generated by friction between the rotary screw 21 and pellets of the thermoplastic resin is driven in the direction of an arrow R and is discharged into the resin chamber 28 of the crosshead Ta. On the other hand, the fiber bundle 1 runs along the zigzag path defined by the parallel guide bars 24a, 24b and 24c in the fiber bundle inlet unit 29. The fiber bundle 1 is pushed in directions perpendicular to the longitudinal axis of the crosshead Ta by the parallel guide bars 24a, 24b and 24c, and thereby the fiber bundle is expanded in a fiber belt 1A. The expanded fiber belt 1A runs through the molten thermoplastic resin 12 contained in the resin chamber 28. Since the filaments of the fiber belt 1A is spread between the guide bars 24c and 25, the fiber belt 1A is impregnated sufficiently with the molten thermoplastic resin 12. Then, the fiber belt 1A is condensed by the condensing bars 26a and 26b in a condensed fiber bundle 1B as shown in FIG. 7. As the condensed fiber bundle 1B runs through the fiber bundle outlet nozzle unit 31, the excessive molten thermoplastic resin and bubbles contained in the condensed fiber bundle 1B are squeezed out from the condensed fiber band 1B. The fiber bundle outlet nozzle unit 31 shapes the condensed fiber bundle 1B in a predetermined size and a predetermined sectional shape to form a prepreg 1C. The sectional shape and size of the opening of the fiber bundle outlet nozzle unit 31 is optional and is determined according to the desired sectional shape, size and fiber content (ratio of the total sectional area of the filaments to the sectional area of the prepreg) of the prepreg 1C. The sectional shape of the opening may be of any shape, such as circular or rectangular. The prepreg 1C is cooled by the cooling unit 22 and the cooled prepreg 1C is taken up by the winding unit 10.

Figure 8:
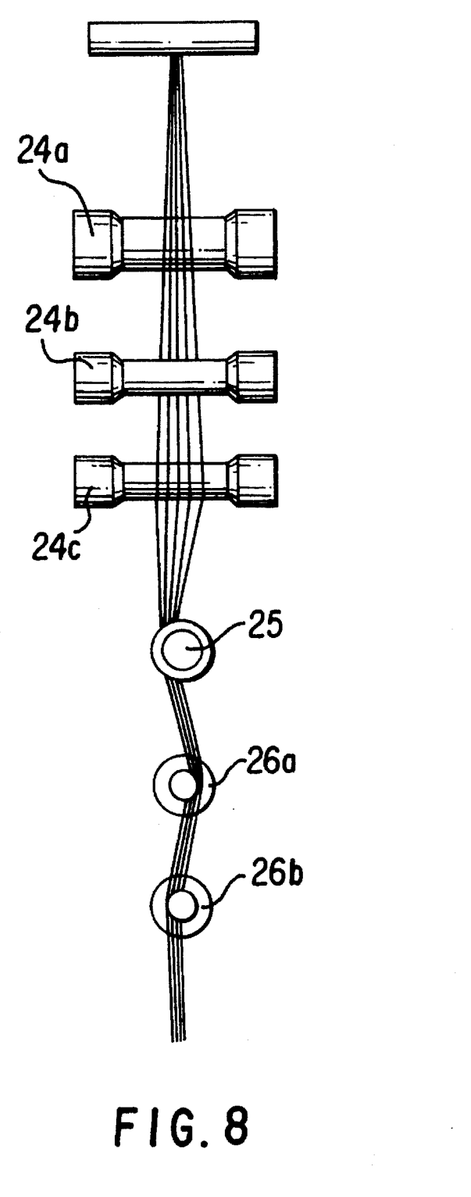
FIG. 8 is an illustration showing the arrangement of parallel bars and condensing bars in a modification of the fifth embodiment.
Figure 9:
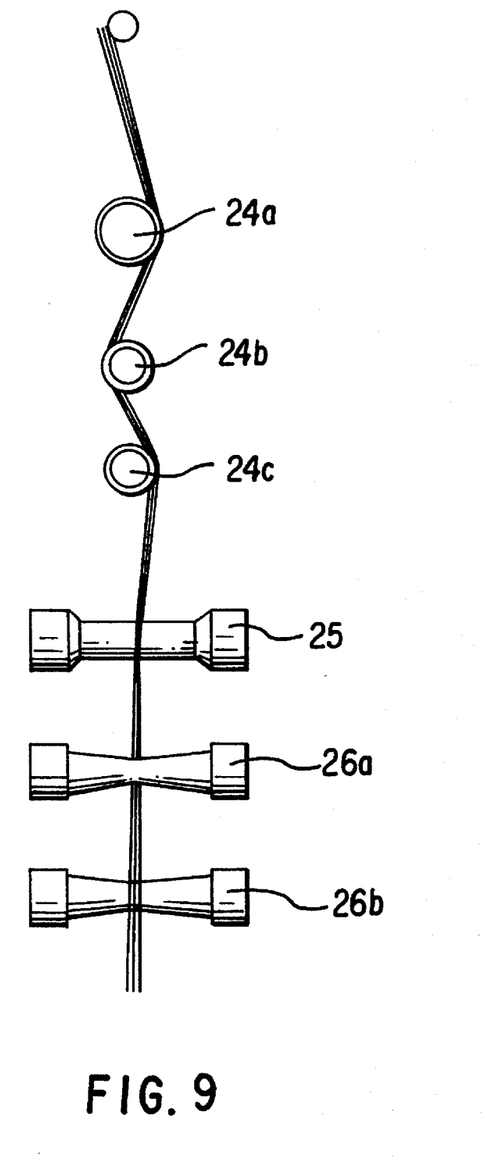
FIG. 9 is an illustration of the arrangement of the parallel bars and the condensing bars of FIG. 8, as viewed from the left in FIG. 8.

Since the fiber bundle 1 is expanded in a band having a thickness in the range of several tens to several hundreds micrometers as the fiber bundle 1 pass through the parallel guide bars 24a, 24b and 24c, the fiber bundle 1 can surely be impregnated with the molten thermoplastic resin and no unimpregnated portion is formed in the fiber bundle 1. Although the parallel guide bars 24a, 24b and 24c, the guide bar 25, and the condensing bars 26a and 26b are fixed bars in the fifth embodiment, these bars may be free rotary bars or rotary bars which are positively driven by driving means. In practice rotary bars exhibit superiority compared to fixed bars on productivity, effective operation of impregnating run and on impregnation degree of resin into fiber bundle. This is due to the impregnation through rotary bars under lower fiber tension that come from low frictional force between rotary bars and fiber bundle. This low fiber tension reduces the fiber breakage and prevents nozzle choking with broken fibers and also allows the winding speed of fiber bundle to be accelerated. These result in higher effective operation and higher productivity. And besides, this low fiber tension allows a plurality of rotary expanding bars 25 which permeate constantly molten resin into fiber bundle by rotation of bar at the contact between bars and fiber bundle. This results in superior degree of impregnation. Furthermore, the parallel guide bars 24a, 24b and 25c may be extended perpendicularly to the guide bar 25 and the condensing bars 26a and 26b as shown in FIGS. 8 and 9. Still further, all the guide bars and the condensing bars may be those respectively having curved surfaces, may be extended respectively at angles to the longitudinal axis of the crosshead Ta or the intervals between these rollers may be adjustable provided that the guide rollers and the condensing rollers are disposed in an arrangement capable of expanding the fiber bundle 1 between the guide bar 24c and the guide bar 25 and condensing the expanded fiber bundle 1 before the fiber bundle 1 enters the fiber bundle outlet nozzle unit 31.

Sealing the fiber bundle inlet unit 29 by an inert gas such as nitrogen gas or argon gas or maintaining the fiber bundle inlet unit 29 in a vacuum state protects the molten thermoplastic resin 12 effectively from deterioration due to oxidation. The extruder Ra may be provided with a plurality of crossheads Ta to achieve simultaneous impregnation of a plurality of fiber bundles.

EXAMPLE

A test continuous FRTP prepreg of 0.9 mm in diameter was manufactured by processing a fiber bundle consisting of carbon filaments as reinforcing filaments and nylon 66 filaments as matrix filaments on the continuous FRTP prepreg manufacturing apparatus shown in FIG. 7. Then, pellets of 3 mm in length for injection molding were prepared by cutting the continuous FRTP prepreg by a strand cutter, and the pellets were melted and molded by an injection molding machine to form a test molding.

A similar molding was prepared as a control by melting and molding pellets prepared by cutting a conventional prepreg manufactured by a conventional process, in which carbon fibers, nylon 66 fibers and the same thermoplastic resin as that used for preparing the test continuous FRTP prepreg were kneaded and extruded.

The test molding and the control were subjected to a tensile strength test and a bending strength test. The test results showed that the strength of the test molding is 1.5 to 2 times that of the control.

As apparent from the foregoing description according to the present invention, the fiber bundle can satisfactorily and sufficiently be impregnated with the molten thermoplastic resin by forcibly making the molten thermoplastic resin permeate the fiber bundle by the impregnating rollers which are dragged by the fiber bundle for rotation or by expanding the fiber bundle during impregnation so that the fiber bundle is impregnated perfectly with the molten thermoplastic resin and by condensing the expanded fiber bundle after impregnation to remove bubbles contained in the resin-impregnated fiber bundle. Accordingly, the continuous FRTP prepreg manufactured by the use of the apparatus and method of the present invention is impregnated sufficiently with the thermoplastic resin and contains no void therein.

Although the invention has been described in its preferred forms with a certain degree of particularity, obviously many changes and variations are possible therein. It is therefore to be understood that the present invention may be practiced otherwise than specifically described herein without departing from the spirit and scope thereof.

What is claimed as new and desired to be secured by Letters Patent of the United States is:

1. A method of manufacturing a continuous fiber reinforced thermoplastic prepreg comprising the steps of, (a) introducing a fiber bundle into a molten thermoplastic resin chamber having an inlet and an outlet;

(b) passing the fiber bundle through the molten thermoplastic resin under tension over a rotary impregnating means frictionally rotated by said fiber bundle, said rotary impregnating means being located within said thermoplastic resin to frictionally impregnate said fiber bundle;

(c) heating the fiber bundle impregnated with the molten thermoplastic resin at the outlet of said resin chamber containing the molten thermoplastic resin in order to prevent voids; and (d) cooling the fiber bundle impregnated with the molten thermoplastic resin outside the resin chamber containing the molten thermoplastic resin to a temperature below the melting point of the thermoplastic resin, wherein the fiber bundle is expanded before being introduced into the molten thermoplastic resin, and the expanded fiber bundle is condensed before being delivered from the resin chamber containing the molten thermoplastic resin.

* * * * *